(12) United States Patent  
Best et al.

(10) Patent No.: US 8,428,107 B1
(45) Date of Patent: Apr. 23, 2013

(54) CODE DETECTION BY USING GENETIC ALGORITHMS

(75) Inventors: Gregory C. Best, San Francisco, CA (US); Bruce D. Riter, Los Altos, CA (US); Bruce Edward Peetz, Los Gatos, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 897 days.

(21) Appl. No.: 12/218,897

(22) Filed: Jul. 17, 2008

Related U.S. Application Data (60) Provisional application No. 61/127,351, filed on May 11, 2008.

(51) Int. Cl.
*H04B 1/69* (2011.01)
*H04B 1/707* (2011.01)
*H04B 1/713* (2011.01)

(52) U.S. Cl.
USPC ........... 375/147; 375/149; 375/150; 375/343; 375/142; 370/210; 370/335

(58) Field of Classification Search ............... 375/147, 375/149, 150, 152, 140–143, 145, 260, 343; 370/210, 335
See application file for complete search history.

(56) References Cited

U.S. PATENT DOCUMENTS

| 6,798,758 | B1 * | 9/2004 | Chun et al. ............ 370/335 |
| 7,260,160 | B1 | 8/2007 | Lennen |
| 2004/0043795 | A1 | 3/2004 | Zancewicz |
| 2005/0128937 | A1 * | 6/2005 | Akopian ............ 370/210 |
| 2005/0177351 | A1 | 8/2005 | Goldberg et al. |
| 2008/0095259 | A1 | 4/2008 | Dyer et al. |

* cited by examiner

*Primary Examiner* — Phuong Phu
(74) *Attorney, Agent, or Firm* — Boris G. Tankhilevich (57) ABSTRACT

A method for estimating an unknown spreading code in a received signal by using a set of genetic algorithms. The method comprises: selecting at least one seed of the unknown spreading code for initialization purposes, wherein the unknown spreading code comprises a plurality of chips, and performing a breeding process of the unknown spreading code by executing a breeding algorithm.

17 Claims, 5 Drawing Sheets

FIG. 1 (Prior Art)

*Simplified Block Diagram of Spread Spectrum Receiver.*

FIG. 2

LFSR as Implemented for GPS PRN I

CODE DETECTION BY USING GENETIC ALGORITHMS

This application claims the priority under the provisional Patent Application No. 61/127,351, filed on May 11, 2008, and entitled: "GENETICS ALGORITHMS FOR CODE DETECTION".

TECHNICAL FIELD

The technology relates to the field of code detection.

BACKGROUND

Spread spectrum techniques is a method for converting a relatively narrow band signal into a wider band signal by mixing the narrow band signal with pseudo-random noise (PRN, or spreading code). The original signal may be recovered by reversing the process. Spread spectrum techniques have several useful properties, among which is a method for sharing spectrum among multiple communications channels. Other methods of multiple access to shared spectrum include time division multiple access (TDMA) which assigns specific time periods to each transmit channel, and frequency division multiple access (FDMA) which assigns subsets of the available spectrum for each transmission channel. Spread spectrum techniques divide neither transmission time nor transmission frequency but instead allow simultaneous transmission through the selection of unique spreading code sequences for each channel—a method referred to as code division multiple access (CDMA).

In a typical spread spectrum radio receiver, the signal received through the antenna undergoes analog processing at radio frequencies. This processing may include filtering, amplification, frequency translation and digital sampling. The signal may then require an additional frequency translation to completely remove any frequency offsets from baseband. In a mobile environment, this stage may also be responsible for eliminating the Doppler effects of moving antennas. In modern receivers, this stage is typically implemented in the digital domain, though an analog implementation is also possible.

A typical spread spectrum radio receiver may include multiple correlators and control loops around the correlators and frequency translators to permit continuous refinement of measurements and tracking of the signal, and to permit decoding of any additional modulation that may be used to carry a data payload.

Typically the spreading code generator in a spread spectrum system is implemented as either a linear feedback shift registers, or as a pre-calculated code stored in memory (referred to as a "memory code"). In both these cases, the spreading code is known by the receiver at the time of manufacture.

Successful estimation of an unknown target spreading code in a received signal possible at run time could be a very important tool for code detection purposes.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of estimating an unknown spreading code is provided. The method comprises selecting at least one seed of the unknown spreading code for initialization purposes, and performing a breeding process of the unknown spreading code by executing a breeding algorithm. The method further comprises executing the breeding algorithm by performing a number of iterations, wherein for each iteration a new generation of the seed pool is created, and wherein each generation of the seed pool comprises a plurality of estimates of the unknown spreading code.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
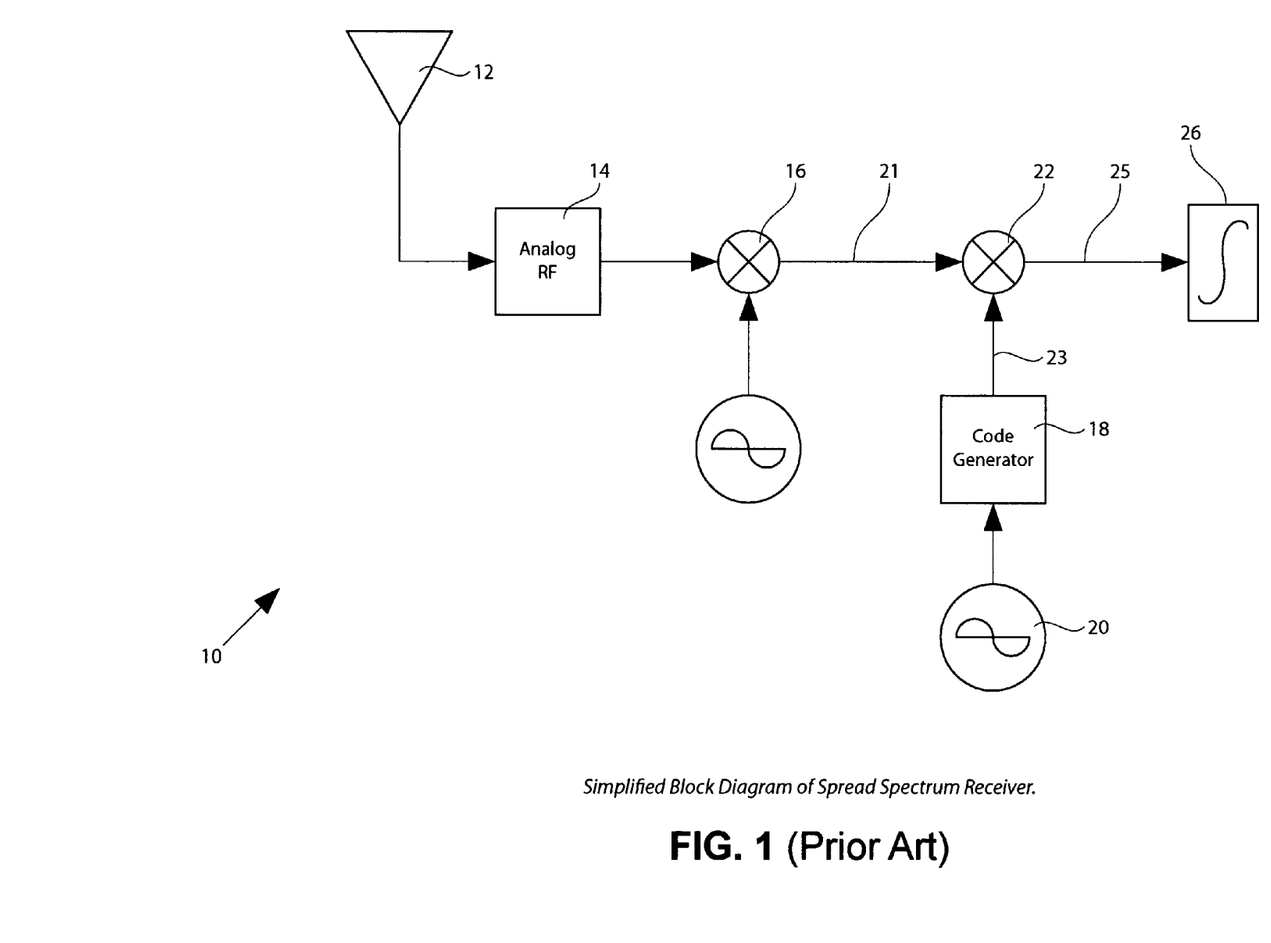
FIG. 1 is a block diagram that illustrates how a typical spread spectrum radio receiver operates.

FIG. 1 is a block diagram 10 that illustrates how a typical spread spectrum radio receiver operates. The signal is received through the antenna 12 and may undergo analog processing 14 at radio frequencies. This processing may include filtering, amplification, frequency translation and digital sampling. The signal may then require an additional frequency translation at block 16 to completely remove any frequency offsets from baseband. In a mobile environment, this stage may also be responsible for eliminating the Doppler effects of moving antennas. In modern receivers, this stage is typically implemented in the digital domain, though an analog implementation is also feasible.

The third and fourth stages of the block diagram form a correlator. The code generator 18, often driven by a controllable frequency source 20, outputs a local hypothesis 23 of the spreading code sequence expected on the incoming signal. In a CDMA system, the local hypothesis is of the desired channel, allowing selection. The local code from the code generator 23 is mixed with the received signal 21 at the block 22 and the result signals 25 are accumulated at the block 26.

Higher accumulation results indicate a better match between the incoming signal and the local code. Non-ideal accumulations can result from incorrect code selection, as well as from the frequency offsets from the baseband, from code phase and frequency errors in the code generator unit, and from noise and other signals on the input.

A typical implementation may include multiple correlators and control loops around the correlators and frequency translators configured to permit continuous refinement of measurements and tracking of the signal, and configured to permit decoding of any additional modulation that may be used to carry a data payload.

Figure 2:
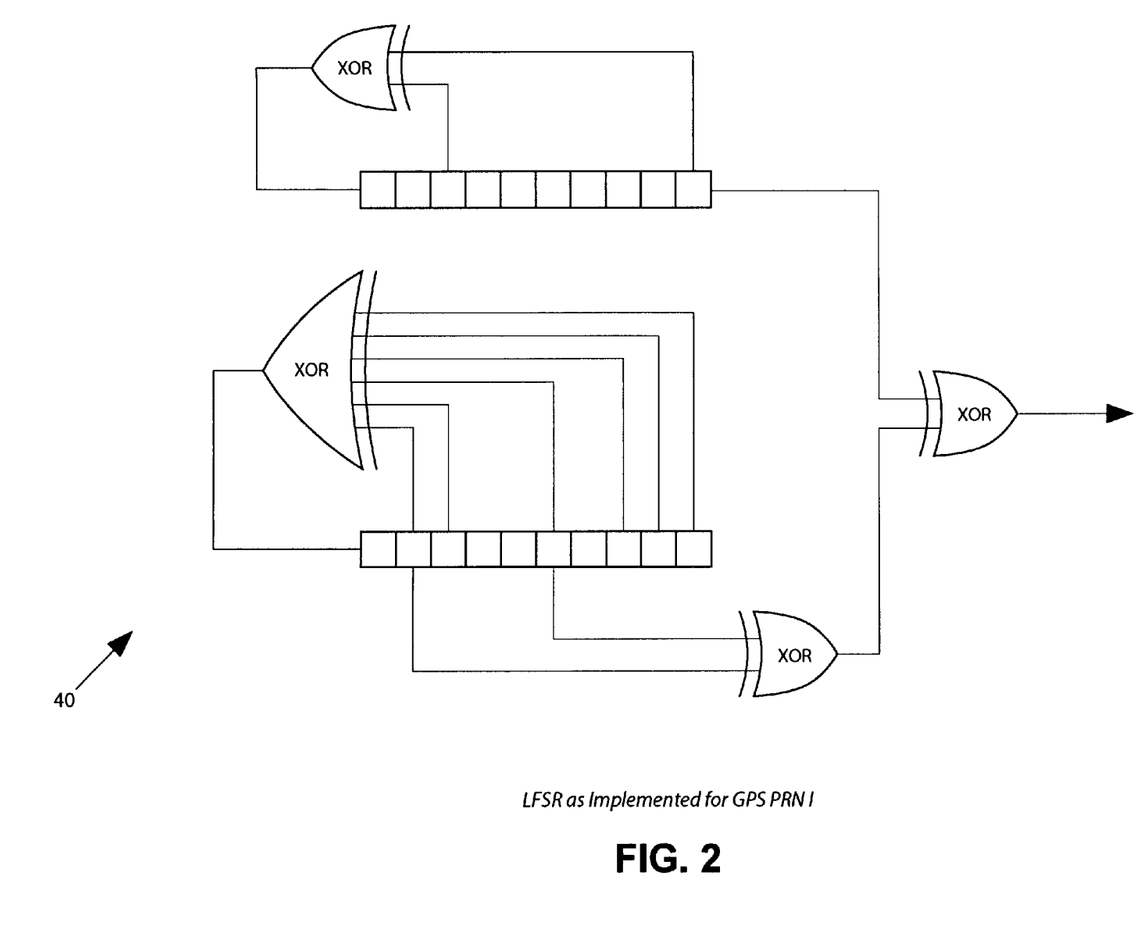
FIG. 2 illustrates a spread spectrum system in which the spreading code generator is implemented as a linear feedback shift register.

In some systems, the spreading code generator in a spread spectrum system is typically implemented as either a linear feedback shift register 40 as shown in FIG. 2, or as a pre-calculated code stored in memory (referred to as a "memory code") (not shown). In both cases, the spreading code is known by the receiver at the time of manufacture.

To illustrate the difficulties associated with solving this problem of estimation of an unknown spreading code in a received signal, let us consider as an example the GPS coarse/acquisition (C/A) code having the sequence of 1023 chips long. A "brute force" approach at estimating this code sequence should include trying all combinations of 1's and 0's requiring $2^{1023}$ attempts, which is an astronomical number.

In one example of the C/A code, whereas the additional information regarding this code (such as the prior knowledge that the C/A code sequence should include approximately half 1's) can be utilized to reduce the search set to $2 \cdot 10^{306}$ attempts, which is an astronomical number as well. Thus, the brutal force approach is not feasible.

Memory codes provide a smaller subset of information to optimize around. However, the search set is still likely to remain intractable.

The present technology utilizes a methodology known as "genetic algorithms" to substantially optimize the search of an unknown spreading code with very limited a priori knowledge of this unknown spreading code itself.

Generally, a genetic algorithm is a search technique used in computing to find exact or approximate solutions to optimization and search problems. Genetic algorithms are categorized as global search heuristics. Genetic algorithms are a particular class of evolutionary algorithms (also known as evolutionary computation) that use techniques inspired by evolutionary biology such as inheritance, mutation, selection, and crossover (also called recombination).

Genetic algorithms are implemented as a computer simulation in which a population of abstract representations (called chromosomes or the genotype or the genome or seed pool in the present disclosure) of candidate solutions (called individuals, creatures, phenotypes, or estimates in the present disclosure) to an optimization problem evolves toward better solutions. Traditionally, solutions are represented in binary as strings of 0s and 1s, but other encodings are also possible. The evolution usually starts from a population of randomly generated individuals and happens in generations. In each generation, the fitness of every individual in the population is evaluated, multiple individuals are stochastically selected from the current population (based on their fitness), and modified (recombined and possibly randomly mutated) to form a new population. The new population is then used in the next iteration of the algorithm. Commonly, the algorithm terminates when either a maximum number of generations has been produced, or a satisfactory fitness level has been reached for the population. If the algorithm has terminated due to a maximum number of generations, a satisfactory solution may or may not have been, reached.

A typical genetic algorithm requires two things to be defined: a genetic representation of the solution domain, and a fitness function to evaluate the solution domain.

A standard representation of the solution is as an array of bits (or plurality of chips in the present disclosure). Arrays of other types and structures can be used in essentially the same way. The main property that makes these genetic representations convenient is that their parts are easily aligned due to their fixed size that facilitates simple crossover operation. Variable length representations may also be used, but crossover implementation is more complex in this case. Tree-like representations are explored in Genetic programming and graph-form representations are explored in Evolutionary programming.

The fitness function is defined over the genetic representation and measures the quality of the represented solution.

Once one has the genetic representation and the fitness function defined, genetic algorithm proceeds to initialize a population of solutions randomly, and to further improve it through repetitive application of mutation, crossover, and inversion and selection operators.

Figure 3:
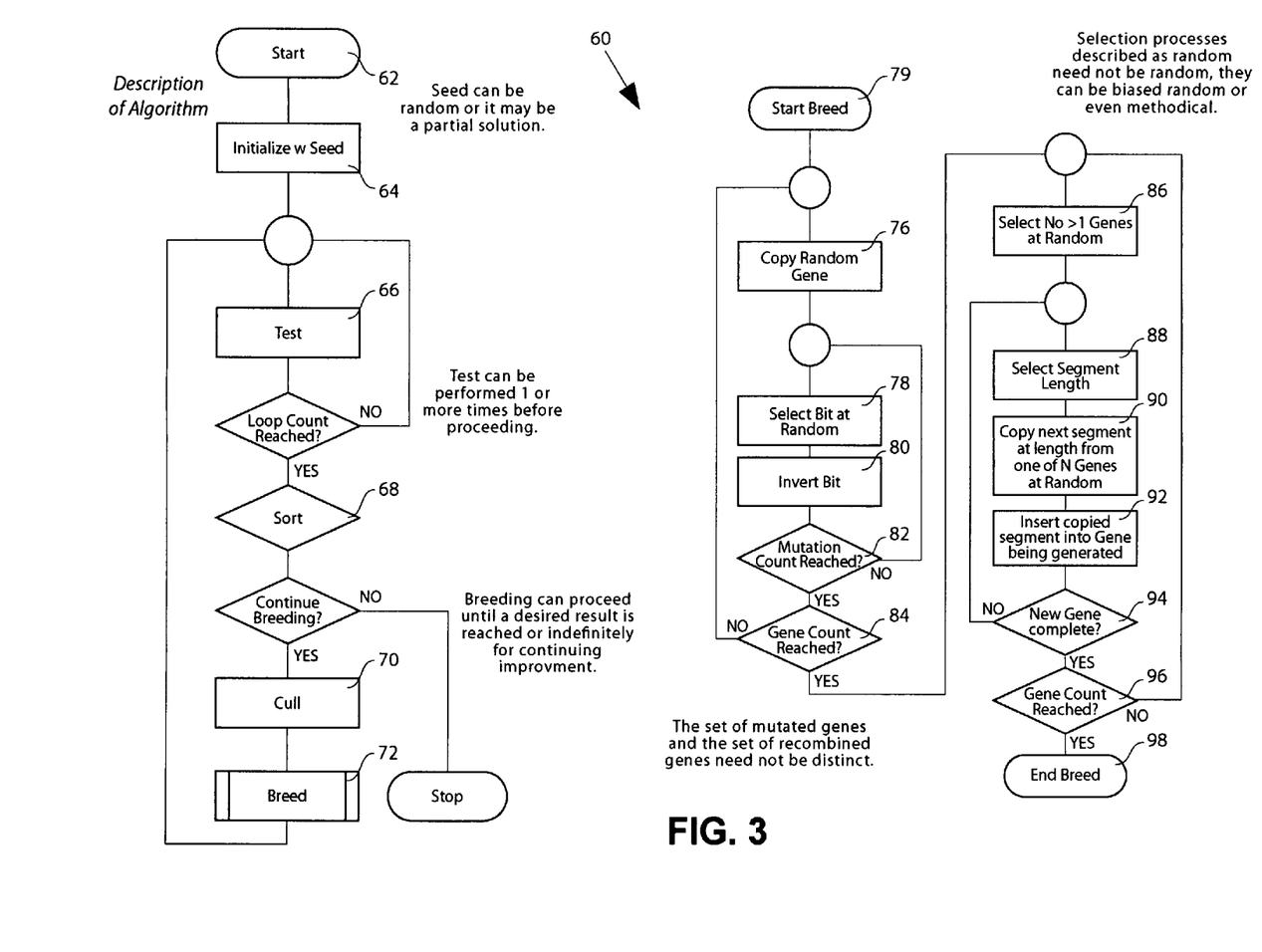
FIG. 3 is a flow chart of the breeding algorithm in accordance with an embodiment of the present technology that utilizes the Genetic Algorithm approach to build a copy of the unknown spreading code.

With reference now to FIG. 3, an exemplary flow chart 60 of the "breeding" algorithm in accordance with an embodiment of the present technology is shown. The flow chart 60 of the "breeding" algorithm utilizes the GA approach to build a copy of the unknown spreading code. There are several important parameters of the breeding algorithm.

(i) Gene Length—is the length in bits of each genetic string. If the length of the target code is known, then the gene length may be chosen to match this code length.

(ii) Pool Size—is the number of genes carried through the algorithm, and might be best described as the number of genes submitted to the testing phase of the algorithm. This number may change through the course of operation to optimize performance and resource requirements, but a typical implementation will maintain a constant pool size.

(iii) Survivor Count—is the number of genes, less than or equal to the pool size, that is carried forward to the next generation. Pool size minus survivor count genes are culled, and replaced through mutation, recombination, or both. The survivor count does not need to remain constant through the course of operation, and may be dynamic to optimize performance. A higher survivor count, for example, will make it less likely that a desirable gene is culled from the pool due to a burst noise event.

(iv) Mutant Count—is the number of new genes added to the pool each generation by mutation.

(v) Recombinant Count—is the number of new genes added to the pool each generation by recombination.

(vi) Mutation Count—is the number of mutations applied to a given gene before being inserted into the gene pool. This number does not need to remain constant and may be dynamic through the course of operation. Starting with a high mutation count early in the operation and steadily reducing the number of mutations per gene as the operation continues can lead to the same desirable properties of simulated annealing. It is also not necessary for this parameter to be constant within a generation if there is some benefit found in adding randomness in the number of mutations, or if a simple function for the declining mutation count cannot be found. An odd mutation count prevents the case where changing a good bit offsets changing a bad bit.

(vii) Progenitor Count—is the number of genes used as inputs to the recombination operation yielding a single offspring at the next generation. Typically the progenitor count will be 2, however other numbers are possible.

(viii) Sub segment length—is the length, less than or equal to the gene length, used in the recombination operation. This number does not need to be constant across generations, nor does it need to remain constant within a single generation or for a single recombination operation. The only requirement is that the sum of the sub segment lengths used for a single recombination operation equals the target gene length.

With reference to FIG. 3, in an embodiment, at the first step 64 the initialization is performed.

The primary initialization involves selecting the starting seed pool. The simplest case would be to initialize all of the seeds randomly. Randomization of the seeds ensures that the starting pool covers a substantial portion of the search space. Initializing all seeds with the same value is undesirable because it limits the diversity of inputs into the later stages.

In a system with a partial knowledge of the solution, the seeds may be pre-calculated, loaded from external systems or loaded from earlier calculations performed locally.

Still with reference to FIG. 3, in an embodiment, the breeding algorithm 60 can be implemented by performing a number of iterations, wherein for each iteration a new generation of the seed pool is created, and wherein each generation of the seed pool comprises a plurality of estimates of the unknown spreading code.

In an embodiment, at the next step 66 of the breeding algorithm 60 the testing operation is performed. In each generation, all genes in the pool are tested against the target code and assigned a metric of success. The most straightforward means of testing would be to measure the correlation between the gene and the incoming signal. This correlation may be performed in time domain, or in frequency domain.

In an embodiment, the testing step 66 is performed by testing each estimate of the unknown spreading code in the seed pool against the target unknown spreading code and by assigning proximity metric. The proximity metric is associated with proximity of each such estimate of the unknown spreading code and the target unknown spreading code.

In an exemplary embodiment, the testing step 66 is performed by testing at least one estimate of the unknown spreading code in the seed pool against the target unknown spreading code by performing a correlation test and by assigning a correlation metric.

If one denotes the target unknown spreading signals as vector x, and the estimate of the unknown spreading code in the seed pool as vector y, the correlation metric is defined as:

$$\mathrm{Corr}(x, y) = \frac{\sum_{i=1}^{d}(x_i - x_{mean})(y_i - y_{mean})}{\sqrt{\sum_{i=1}^{d}(x_i - x_{mean})^2 \sum_{i=1}^{d}(y_i - y_{mean})^2}} \quad (\text{Eq. 1})$$

The correlation similarity measure is the covariance, divided by the variances, and takes values between −1 and 1.

In an embodiment, the correlation metric is described in the following terms: the number of chips of the estimate code that resembles the number of chips in the target code. For a target code, the number of chips was assumed to be 4095=(2^12)−1). So, for example, if the number of chips in the estimate code that resembles the chips in the target code is 2500, the correlation metric is 2500/4095=61%=0.61. Thus, the correlation metric is indicative of correlation between the estimate of the unknown spreading code in the seed pool and the target unknown spreading code.

In an exemplary embodiment, still referring to FIG. 3, the testing step 66 is performed by testing at least one estimate of the unknown spreading code in the seed pool against the target unknown spreading code by performing a correlation test in time domain, and by assigning a time correlation metric. The time correlation metric is indicative of correlation between the estimate of the unknown spreading code in the seed pool and the target unknown spreading code measured in time domain.

In a further exemplary embodiment, still referring to FIG. 3, the testing step 66 is performed by testing at least one estimate of the unknown spreading code in the seed pool against the target unknown spreading code by performing a correlation test in time domain, for each phase offset between the target unknown code and the estimate of the unknown spreading code, by assigning a time correlation metric, and by selecting a maximum correlation metric.

Figure 4:
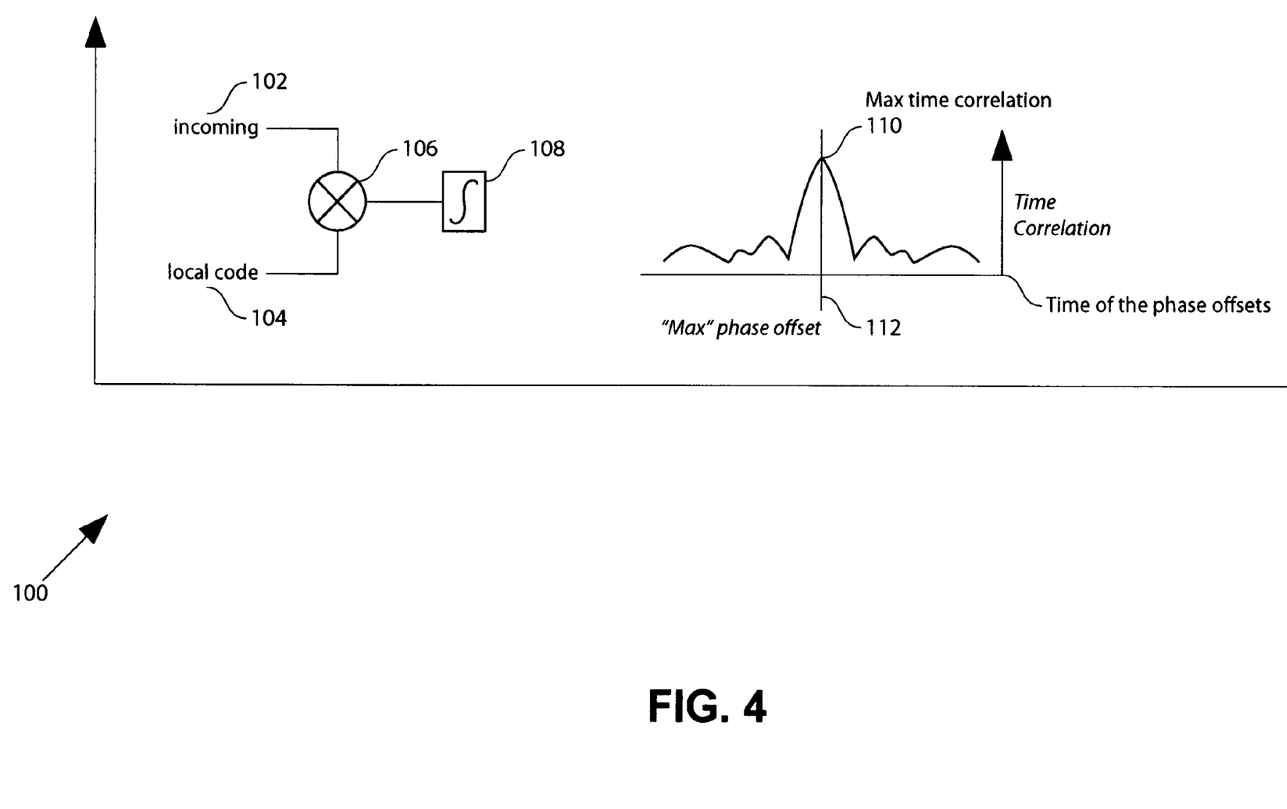
FIG. 4 depicts a simple block diagram configured to perform a correlation test in the time domain, for each phase offset between the target unknown code and an estimate of the unknown spreading code. The maximum correlation peak corresponds to one such phase offset which is labeled a "maximum" phase offset.

With reference to FIG. 4, in an embodiment, a simple block diagram 110 is configured to perform a correlation test in time domain, for each phase offset between the target unknown code and at least one estimate of the unknown spreading code. The maximum correlation peak 110 corresponds to one such phase offset 112 which is labeled as a "maximum" phase offset.

With reference still to FIG. 3, in an additional exemplary embodiment, the testing step 66 is performed by testing at least one estimate of the unknown spreading code in the seed pool against the target unknown spreading code by a correlation test in frequency domain, and by assigning a frequency correlation metric. The frequency correlation metric is indicative of correlation between the estimate of the unknown spreading code in the seed pool and the target unknown spreading code measured in frequency domain. The correlation test in frequency domain can be also performed. There is at least one maximum frequency correlation peak corresponding to at least one optimum frequency.

With reference to FIG. 3, in an embodiment, at the next step 68 the sorting operation is performed. Indeed, after testing is done, the gene pool should be sorted in rank order of the assigned metric (which is typically a correlation with the incoming signal).

With reference still to FIG. 3, in an exemplary embodiment, the sorting step 68 can be done as a separate step.

With the further reference to FIG. 3, in another exemplary embodiment, the sorting step 68 can be combined with the cull step 70. The sort itself is not of value, the goal is simply to establish a threshold where survivor count genes exceed the threshold. The setting of the threshold allows one to set a desired convergence speed of the breeding algorithm.

Referring still to FIG. 3, in an embodiment, for each iteration, after at least one estimate of the unknown spreading code in the seed pool is tested against the target unknown spreading code and is assigned metric, the following sorting operation (step 68) is performed: (a) introducing a survivor threshold, (b) performing a sorting operation to sort the plurality of the estimates of the unknown spreading code in a rank order of the assigned metrics, (or assigned correlation metrics in another embodiment of the presented embodiments) and (c) determining a survivor count. The survivor count number is an integer less than or equal to the pool size of the plurality of estimates of the unknown spreading code.

In an embodiment, the survivor count is a number of the estimates of the unknown spreading code each of which includes a threshold metric that exceeds the survivor threshold.

In another embodiment, the survivor count is a number of the estimates of the unknown spreading code each of which includes a threshold metric that exceeds the survivor correlation threshold. Thus, the survivor count is the number of the estimates of the unknown spreading code that is carried forward to the next generation.

In one exemplary embodiment, each estimate of the unknown spreading code in the seed pool that has a rank higher than the survivor threshold is kept.

In another exemplary embodiment, each estimate of the unknown spreading code in the seed pool that has a rank lower than the survivor threshold is discarded.

In one more exemplary embodiment, if there is a plurality of the estimates of the unknown spreading code having an equal rank at the survivor threshold, the original survivor count is reduced by discarding each estimate of the unknown spreading code having an equal rank at the survivor threshold.

In an additional exemplary embodiment, if there is a plurality of the estimates of the unknown spreading code having an equal rank at the survivor threshold, the original survivor correlation count is increased by retaining each estimate of the unknown spreading code having an equal rank at the survivor threshold.

In one more additional exemplary embodiment, if there is a plurality of the estimates of the unknown spreading code having an equal rank at the survivor threshold, each estimate of the unknown spreading code having an equal rank at the survivor threshold is additionally sorted by using second rank criteria.

Yet, in another exemplary embodiment, if there is a plurality of the estimates of the unknown spreading code criteria having an equal rank at the survivor threshold after being sorted by using a preceding rank criteria, each estimate of the unknown spreading code having an equal rank at the survivor threshold is additionally sorted by using a subsequent rank criteria, such as the historical performance of each estimate. One method of carrying historical information forward to the next generation would be to assign a simple counter to each estimate, and increment the counter at each generation in which the estimate survives. When two estimates have equal rank, the estimate with the higher counter value would be preferred.

With reference still to FIG. 3, in an embodiment, the execution of the breeding algorithm is preferably repeated until the satisfactory estimate of the target code is obtained. As a result, one would keep only the first plurality of the pool of the seeds for further processing. For example, if the pool of the seeds includes 90 seeds, only 30 top seeds are kept for further processing. The other two/thirds seeds of the seed pool could be obtained by performing the operations of mutation and recombination. The purpose of these two operations is to increase the convergence of the breeding algorithm.

With the further reference to FIG. 3, in an embodiment, after the cull (step 70) is performed, mutant count genes are inserted into the pool through mutation (steps 74-84) in one iteration. The mutation operation selects a surviving gene (step 78), as a basis and inverts mutation count bits (step 80), chosen at random. The selection of the survivor to be used as a basis can be uniformly random, can be biased towards those genes with the highest metric after the test, or can take other considerations into account. The purpose of the mutation operation is to introduce new information into the gene pool and to ensure that bits won't be forever stuck at an incorrect state simply because no gene in the pool has that bit set at the proper state. The number of iterations of the mutation process (steps 74-84) is preferably repeated until the predetermined gene count 84 is reached.

Furthermore, in an embodiment, after the cull (step 70) is performed to cut off all but the top surviving genes (survivors), recombinant count genes are inserted into the seed pool through the recombination process (steps 86 through 98).

In an exemplary embodiment, at least two genes are selected among the survivors (step 86) as a progenitor count. Selection may be uniformly random, may be biased towards the genes with the highest metric after the test, or may take other considerations into account (for instance, a gene pool that was successful in overcoming the effects of noise).

With reference to FIG. 3, in an embodiment, at step 88 each progenitor is broken into sub segments of sub segment length. Indeed, segments at different sequential locations on the same progenitor do not have to have the same length. However, the segments at the same sequential location on each progenitor should be of the same length.

With the further reference to FIG. 3, in an embodiment, in forming a new gene, one segment at each sequential location is copied (steps 90-92) from a randomly selected progenitor into the newly created gene. The iterations of the recombination process (steps 86-92) are preferably repeated until the predetermined gene count 96 is reached.

The role of recombination is to mix sub segments of the local codes, intact. If two sub segments that are particularly well matched to the incoming code are combined into a new gene, the resulting gene will make substantial progress towards achieving a full match. If two sub segments that are not well matched are combined, the resulting gene will be more likely to be culled.

It should also be noted that for many typical PRN codes, it is not critical that the sub segments are sequential bits. A "sub segment" may be represented by a number of bits at non-sequential locations along the gene, as long as that "sub segment" is represented by the same bit indices on all progenitors and all bits in the gene are accounted for in exactly one sub segment.

It should also be noted that mutation and recombination do not need to be done entirely separately. Mutation may be applied to some or to all of the results of recombination in addition to the survivors of the previous generations.

Figure 5:
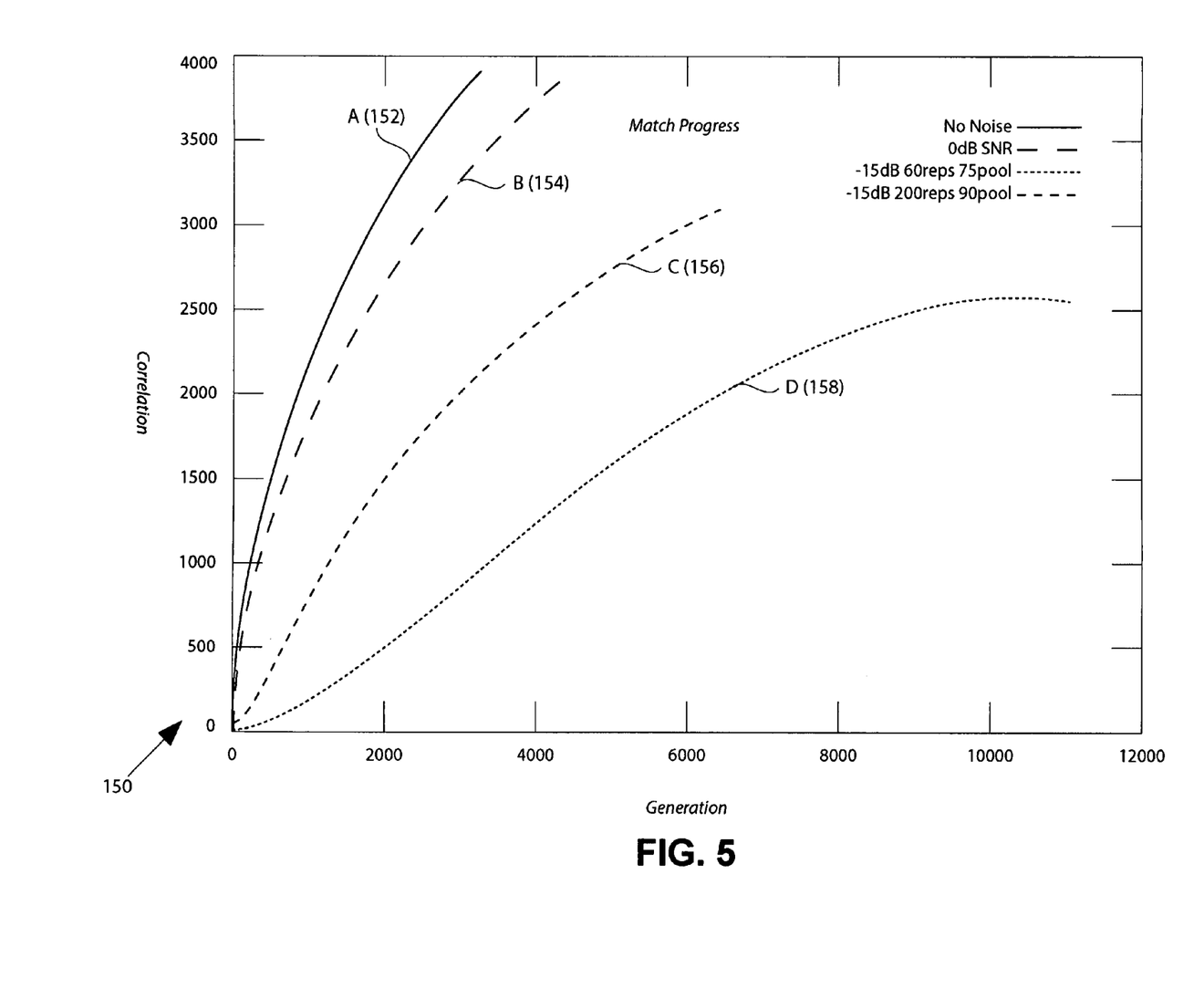
FIG. 5 illustrates four different tests. Test A is the correlation of one epoch of the estimate code sequence against the incoming target signal per generation, with no noise present. Test B is the same, but with 0 dB SNR. Test C is with (−15 dB) SNR but the estimate code sequence is correlated for 60 iterations per generation. Test D is with (−15 dB) SNR but the correlation/integration time is extended to 200 iterations per generation and the seed pool is expanded to 90.

FIG. 5 illustrates four different tests. Test A (152) depicts a numerator of the correlation metric (of Eq. 1) of one epoch of the code sequence versus the incoming signal, with no noise present. Test B (154) is the same, but with 0 dB SNR (noise and signal of equal power. Test C (156) is with a −15 dB SNR (the level that GPS is received at), but the code sequence is correlated for 60 full epochs (60 iterations) before the test which introduces additional gain. In all three tests described so far, the seed pool contains 75 estimates. In the final test D (159) the SNR is still −15 dB but the correlation/integration time is extended to 200 epochs (200 iterations) and the seed pool is expanded to 90. These tests were performed in Octave (Mat Lab equivalent)

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method implemented in a receiver of estimating an unknown spreading code in a received signal; said unknown spreading code comprising a plurality of chips; said method comprising:
    (A) selecting an initial code; and
    (B) performing an estimation of said unknown spreading code by performing a number of iterations, wherein for each said iteration a new generation of a seed pool is created, and wherein each said generation of said seed pool comprises a plurality of estimates of said unknown spreading code; and wherein for each said iteration, wherein at least one said estimate of said unknown spreading code in said seed pool is tested against said target unknown spreading code and is assigned metric by: (a) introducing a survivor threshold; (b) performing a sorting operation to sort said plurality of said estimates of said unknown spreading code in a rank order of the assigned metrics; (c) determining a survivor count; and (d) keeping each said estimate of said unknown spreading code in said seed pool having a rank higher than said survivor threshold;
    wherein said survivor count is a number of said estimates of said unknown spreading code each of which includes a metric that exceeds said survivor threshold;
    and wherein said survivor count is said number of said estimates of said unknown spreading code that is carried forward to the next generation; said survivor count number being an integer less than or equal to said pool size of said plurality of estimates of said unknown spreading code.

2. A method implemented in a receiver of estimating an unknown spreading code in a received signal; said unknown spreading code comprising a plurality of chips; said method comprising:
    (A) selecting an initial code; and
    (B) performing an estimation of said unknown spreading code by performing a number of iterations, wherein for each said iteration a new generation of a seed pool is created, and wherein each said generation of said seed pool comprises a plurality of estimates of said unknown spreading code; and wherein for each said iteration, wherein at least one said estimate of said unknown spreading code in said seed pool is tested against said target unknown spreading code and is assigned metric by: (a) introducing a survivor threshold; (b) performing a sorting operation to sort said plurality of said estimates of said unknown spreading code in a rank order of the assigned metrics; (c) determining a survivor count; and (d) discarding each said estimate of said unknown spreading code in said seed pool having a rank lower than said survivor threshold;
    wherein said survivor count is a number of said estimates of said unknown spreading code each of which includes a metric that exceeds said survivor threshold;
    and wherein said survivor count is said number of said estimates of said unknown spreading code that is carried forward to the next generation; said survivor count number being an integer less than or equal to said pool size of said plurality of estimates of said unknown spreading code.

3. A method implemented in a receiver of estimating an unknown spreading code in a received signal; said unknown spreading code comprising a plurality of chips; said method comprising:
    (A) selecting an initial code; and
    (B) performing an estimation of said unknown spreading code by performing a number of iterations, wherein for each said iteration a new generation of a seed pool is created, and wherein each said generation of said seed pool comprises a plurality of estimates of said unknown spreading code; and wherein for each said iteration, wherein at least one said estimate of said unknown spreading code in said seed pool is tested against said target unknown spreading code and is assigned metric by: (a) introducing a survivor threshold; (b) performing a sorting operation to sort said plurality of said estimates of said unknown spreading code in a rank order of the assigned metrics; (c) determining a survivor count; and (d) if there is a plurality of said estimates of said unknown spreading code having an equal rank at said survivor threshold, reducing said original survivor count by discarding each said estimate of said unknown spreading code having said equal rank at said survivor threshold;
    wherein said survivor count is a number of said estimates of said unknown spreading code each of which includes a metric that exceeds said survivor threshold;
    and wherein said survivor count is said number of said estimates of said unknown spreading code that is carried forward to the next generation; said survivor count number being an integer less than or equal to said pool size of said plurality of estimates of said unknown spreading code.

4. A method implemented in a receiver of estimating an unknown spreading code in a received signal; said unknown spreading code comprising a plurality of chips; said method comprising:

(A) selecting an initial code; and (B) performing an estimation of said unknown spreading code by performing a number of iterations, wherein for each said iteration a new generation of a seed pool is created, and wherein each said generation of said seed pool comprises a plurality of estimates of said unknown spreading code; and wherein for each said iteration, wherein at least one said estimate of said unknown spreading code in said seed pool is tested against said target unknown spreading code and is assigned metric by: (a) introducing a survivor threshold; (b) performing a sorting operation to sort said plurality of said estimates of said unknown spreading code in a rank order of the assigned metrics; (c) determining a survivor count; and (d) if there is a plurality of said estimates of said unknown spreading code having an equal rank at said survivor threshold, increasing said original survivor correlation count by retaining each said estimate of said unknown spreading code having said equal rank at said survivor threshold;

wherein said survivor count is a number of said estimates of said unknown spreading code each of which includes a metric that exceeds said survivor threshold;

and wherein said survivor count is said number of said estimates of said unknown spreading code that is carried forward to the next generation; said survivor count number being an integer less than or equal to said pool size of said plurality of estimates of said unknown spreading code.

5. A method implemented in a receiver of estimating an unknown spreading code in a received signal; said unknown spreading code comprising a plurality of chips; said method comprising:

(A) selecting an initial code; and (B) performing an estimation of said unknown spreading code by performing a number of iterations, wherein for each said iteration a new generation of a seed pool is created, and wherein each said generation of said seed pool comprises a plurality of estimates of said unknown spreading code; and wherein for each said iteration, wherein at least one said estimate of said unknown spreading code in said seed pool is tested against said target unknown spreading code and is assigned metric by: (a) introducing a survivor threshold; (b) performing a sorting operation to sort said plurality of said estimates of said unknown spreading code in a rank order of the assigned metrics; (c) determining a survivor count; and (d) if there is a plurality of said estimates of said unknown spreading code having an equal rank at said survivor threshold, additionally sorting each said estimate of said unknown spreading code having said equal rank at said survivor threshold by using a second rank criteria;

wherein said survivor count is a number of said estimates of said unknown spreading code each of which includes a metric that exceeds said survivor threshold;

and wherein said survivor count is said number of said estimates of said unknown spreading code that is carried forward to the next generation; said survivor count number being an integer less than or equal to said pool size of said plurality of estimates of said unknown spreading code.

6. A method implemented in a receiver of estimating an unknown spreading code in a received signal; said unknown spreading code comprising a plurality of chips; said method comprising:

(A) selecting an initial code; and (B) performing an estimation of said unknown spreading code by performing a number of iterations, wherein for each said iteration a new generation of a seed pool is created, and wherein each said generation of said seed pool comprises a plurality of estimates of said unknown spreading code; and wherein for each said iteration, wherein at least one said estimate of said unknown spreading code in said seed pool is tested against said target unknown spreading code and is assigned metric by: (a) introducing a survivor threshold; (b) performing a sorting operation to sort said plurality of said estimates of said unknown spreading code in a rank order of the assigned metrics; (c) determining a survivor count; and (d) if there is a plurality of said estimates of said unknown spreading code criteria having an equal rank at said survivor threshold after being sorted by using a preceding rank criteria, additionally sorting each said estimate of said unknown spreading code having said equal rank at said survivor threshold by using a subsequent rank criteria;

wherein said survivor count is a number of said estimates of said unknown spreading code each of which includes a metric that exceeds said survivor threshold;

and wherein said survivor count is said number of said estimates of said unknown spreading code that is carried forward to the next generation; said survivor count number being an integer less than or equal to said pool size of said plurality of estimates of said unknown spreading code.

7. A method implemented in a receiver of estimating an unknown spreading code in a received signal; said unknown spreading code comprising a plurality of chips; said method comprising:

(A) selecting an initial code; and (B) performing an estimation of said unknown spreading code by executing a genetic breeding algorithm, wherein said genetic breeding algorithm is configured to use said initial code to perform said estimation of said unknown spreading code; and wherein said genetic breeding algorithm is being built by selecting a number of estimates of said unknown spreading code among a pool of estimates of said unknown spreading code having a rank higher than a survivor threshold to be used as inputs to a recombination process yielding at least one offspring at the next generation; wherein said number of estimates used in said recombination process yielding said at least one offspring at the next generation is defined as a progenitor count; and wherein each said estimate of said unknown spreading code selected to be said input into said recombination process is defined as a progenitor member of said recombination process.

8. The method of claim 7, wherein said step (B) further comprises:

(B1) using a uniformly random selection process to select at least one said progenitor member.

9. The method of claim 7, wherein said step (B) further comprises:

(B2) using a selection process biased towards said estimates of said unknown spreading code having highest rank to select at least one said progenitor member.

10. The method of claim 7, wherein said step (B) further comprises:

(B3) breaking each said progenitor member into a plurality of sub-segments; wherein each said sub-segment is characterized by having a sub-segment length.

11. The method of claim 10, wherein said step (B3) further comprises:

(B3, 1) breaking each said progenitor member into a plurality of said sub-segments; wherein said sub-segments at different sequential locations on said same progenitor are characterized by having different sub-segment lengths.

12. The method of claim 10, wherein said step (B3) further comprises:

(B3, 2) breaking each said progenitor member into a plurality of said sub-segments; wherein each said sub-segment at the same sequential location on at least two progenitors is characterized by having the same sub-segment length.

13. A method in implemented in a receiver of estimating an unknown spreading code in a received signal; said unknown spreading code comprising a plurality of chips; said method comprising:

(A) an initial code; and (B) performing an estimation of said unknown spreading code by executing a genetic breeding algorithm, wherein said genetic breeding algorithm is configured to use said initial code to perform said estimation of said unknown spreading code; and wherein said genetic breeding algorithm is being built by forming a new estimate of said unknown spreading code by performing the following sub-steps:

(B1) selecting at least two progenitors;

(B2) creating random sub-groups of said progenitors; wherein each said sub-group includes at least two said progenitors;

(B3) sub-segmenting each said progenitor belonging to said at least one randomly selected sub-group by slicing each said progenitor into a number of sub-segments; wherein for each said progenitor from said one sub-group said firstly sliced sub-segment includes a first chip count; wherein for each said progenitor from said one sub-group said secondly sliced sub-segment includes a second chip count; and wherein for each said progenitor from said one sub-group said "k"-sliced sub-segment includes a "k"-th chip count; k being an integer;

(B4) at each sequential location copying one said sub-segment from one said randomly selected progenitor into said newly created estimate of said unknown spreading code at corresponding sequential location; and (B5) selecting a slice as a number of contiguous chips of progenitor.

14. A method implemented in a receiver of estimating an unknown spreading code in a received signal; said unknown spreading code comprising a plurality of chips; said method comprising:

(A) selecting an initial code; and (B) performing an estimation of said unknown spreading code by executing a genetic breeding algorithm, wherein said genetic breeding algorithm is configured to use said initial code to perform said estimation of said unknown spreading code; and wherein said genetic breeding algorithm is being built by forming a new estimate of said unknown spreading code by performing the following sub-steps:

(B1) selecting at least two progenitors;

(B2) creating random sub-groups of said progenitors; wherein each said sub-group includes at least two said progenitors;

(B3) sub-segmenting each said progenitor belonging to said at least one randomly selected sub-group by slicing each said progenitor into a number of sub-segments; wherein for each said progenitor from said one sub-group said firstly sliced sub-segment includes a first chip count; wherein for each said progenitor from said one sub-group said secondly sliced sub-segment includes a second chip count; and wherein for each said progenitor from said one sub-group said "k"-sliced sub-segment includes a "k"-th chip count; k being an integer;

(B4) at each sequential location copying one said sub-segment from one said randomly selected progenitor into said newly created estimate of said unknown spreading code at corresponding sequential location; and (B6) selecting a slice as a number of non-contiguous chips of a progenitor, wherein each said non-contiguous slice of said progenitor is defined as a set of chips of one said progenitor, wherein each said chip in each said non-contiguous slice is assigned a chip sequential number; and wherein for each said non-contiguous slice copied to an estimate of said unknown target code each said chip of one said progenitor is placed at said estimate of said unknown target code according to said chip sequential number.

15. A method implemented in a receiver of estimating an unknown spreading code in a received signal; said unknown spreading code comprising a plurality of chips; said method comprising:

(A) selecting an initial code; and (B) performing an estimation of said unknown spreading code by executing a genetic breeding algorithm, wherein said genetic breeding algorithm is configured to use said initial code to perform an estimation of said unknown spreading code; and wherein said step (B) further comprises:

(B1) building said breeding algorithm by performing a mutation process to select a surviving estimate of said unknown spreading code, as a basis, and to invert mutation count chips.

16. The method of claim 15, wherein said step (B1) further comprises:

(B1, 1) using a uniformly random selection process to select at least one said surviving estimate of said unknown spreading code.

17. The method of claim 15, wherein said step (B1) further comprises:

(B1, 2) using a selection process biased towards said estimates of said unknown spreading code having highest rank to select at least one said surviving estimate of said unknown spreading code.

* * * * *